O. W. HULT.
DRIVING DEVICE FOR MOTOR CYCLES AND OTHER VEHICLES.
APPLICATION FILED JAN. 4, 1918.
1,259,989.
Patented Mar. 19, 1918.
2 SHEETS—SHEET 1.
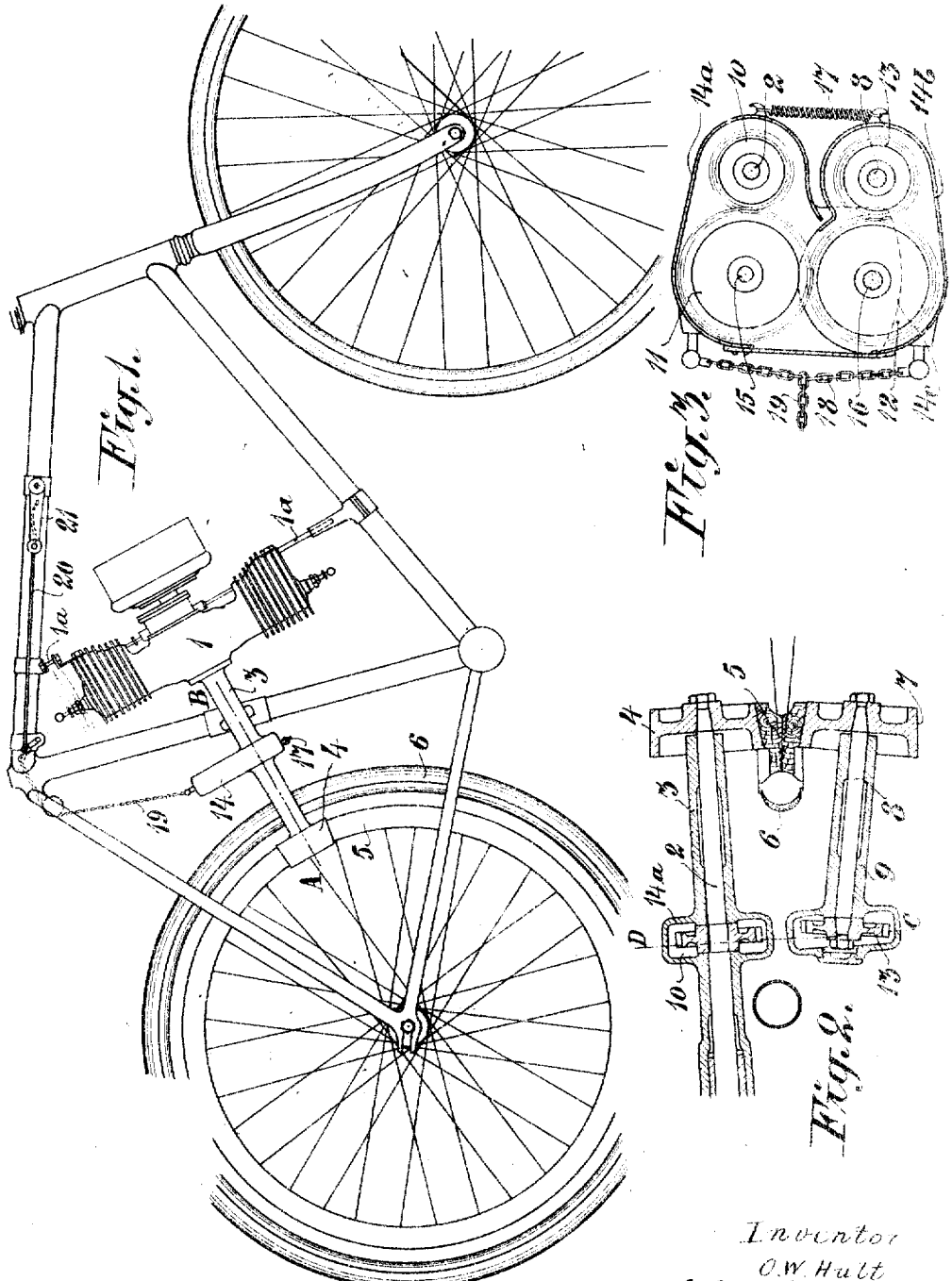
Inventor
O. W. Hult
By H. R. Kerslake
Atty O. W. HULT.
DRIVING DEVICE FOR MOTOR CYCLES AND OTHER VEHICLES.
APPLICATION FILED JAN. 4, 1918.
1,259,989.
Patented Mar. 19, 1918.
2 SHEETS—SHEET 2.
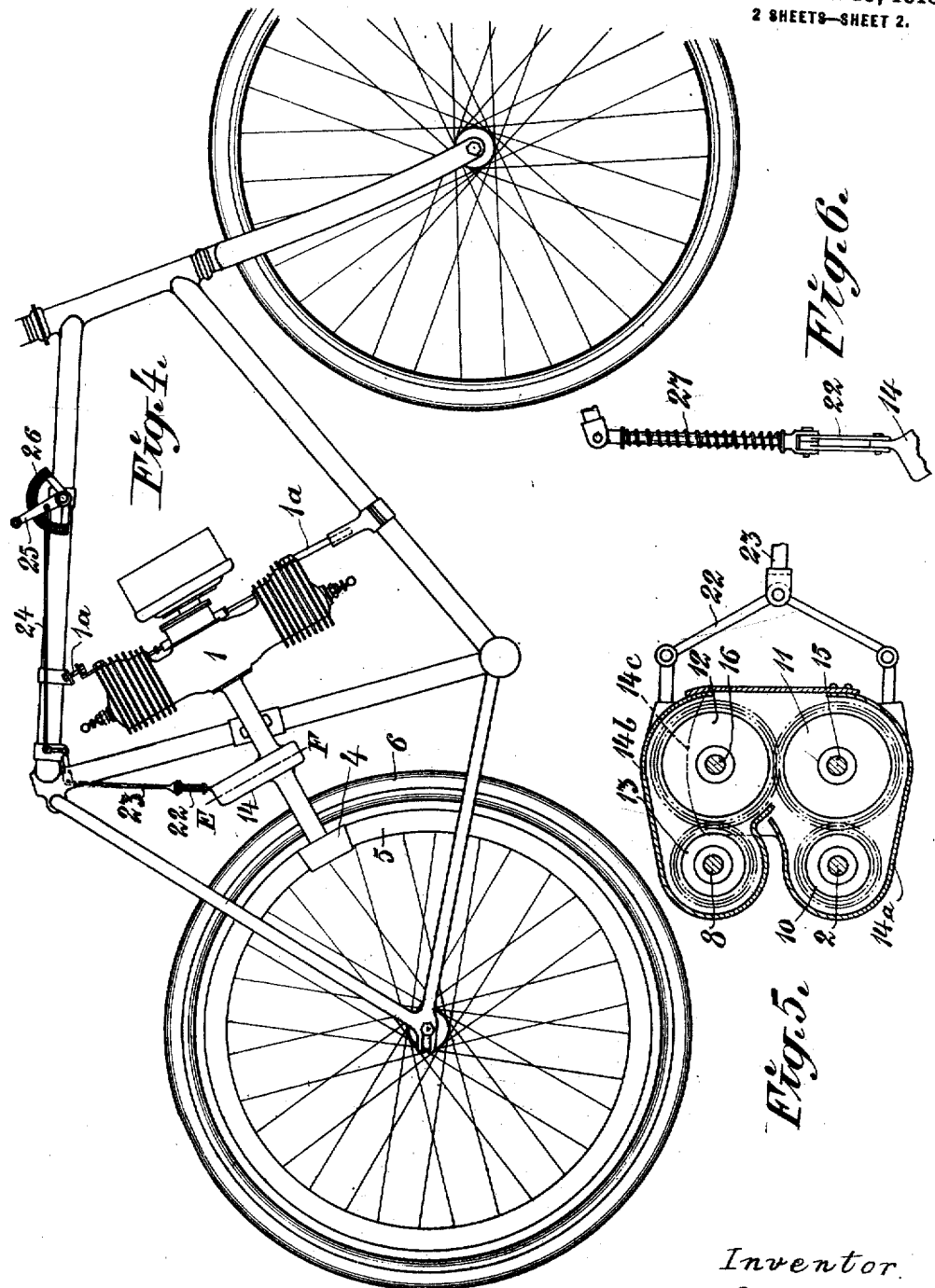
Inventor
O. W. Hult
By H. R. Kerslake
Atty

UNITED STATES PATENT OFFICE.

OSCAR WALFRID HULT, OF STOCKHOLM, SWEDEN.

DRIVING DEVICE FOR MOTOR-CYCLES AND OTHER VEHICLES.

1,259,989.  Specification of Letters Patent.  Patented Mar. 19, 1918.

Application filed January 4, 1918. Serial No. 210,390.

*To all whom it may concern:*

Be it known that I, OSCAR WALFRID HULT, a subject of the King of Sweden, and resident of Inedalsgatan 1, Stockholm, in the Kingdom of Sweden, have invented certain new and useful Improvements in Driving Devices for Motor-Cycles and other Vehicles, of which the following is a specification, reference being made to the accompanying drawings.

The present invention relates to driving devices for motor cycles or other vehicles, in which one or more rollers or the like transmit motive power to one or more paths, situated at each side of the driving wheel of the cycle (or the vehicle) and connected with it. For the purpose of setting the rollers against their paths or for removing them therefrom the shafts of the rollers can, according to this invention, be swung against and from each other about an axis or axes or pivots respectively located outside the plane common to the roller shafts. By this invention a device is obtained which brings with it a reliable transmission of power to the driving wheel and a powerful pressing of the rollers against their paths in a simple and rapid way, and at the same time the very device is especially simple.

The annexed drawings show by way of example driving devices carried out according to this invention and mounted on motor cycles, to the driving wheel of which power is delivered at both sides. Figure 1 shows a motor cycle in side view. Fig. 2 shows a section on the line A—B in Fig. 1, while Fig. 3 shows a section on the line C—D in Fig. 2. Fig. 4 shows another cycle in side view. while Fig. 5 shows a section on the line E—F in Fig. 4. Fig. 6 shows a modification of the device illustrated in Figs. 4 and 5.

The motor 1 is shown to be a two cylinder balanced motor. Its cylinders are by means of pivots 1ª mounted in the cycle frame in such a manner as to allow them to turn about an axis parallel to their center line.

The motor shaft 2 which is located in a sleeve 3 fixed to the crank casing of the motor carries at its free end a roller 4 acting against one side of a rail 5 fixed to the cycle driving wheel 6 just inside the rim of the same. Against the other side of the rail 5 acts a roller 7 mounted on a shaft 8. located in a sleeve 9. On the motor shaft 2 there is fixed a toothed wheel 10 engaging with a toothed wheel 11 which in its turn engages with a toothed wheel 12, which again engages with a toothed wheel 13, mounted on the rear end of the shaft 8. Motive power is thus transmitted to the two rollers 4 and 7 which, by means of the paths formed by the rail 5, deliver the same to the driving wheel of the cycle.

The toothed wheels 10—13 are inclosed in a casing 14, and the toothed wheels 11 and 12 are mounted on pivots 15 and 16 located in said casing. The casing 14 consists of two parts or members 14ª and 14ᵇ which can turn in relation to each other. The sleeve 3 is rigidly attached to one, 14ª, of said parts or is integral with it, while the sleeve 9 is rigidly attached to the casing part 14ᵇ or is integral with the same. Said casing part is rotatable about the pivot 16 of the toothed wheel 12, said pivot 16 being mounted in the casing part 14ᵇ as well as in lateral pieces 14ᶜ, which belong to the casing part 14ª and inclose the casing part 14ᵇ. As will be seen, this arrangement allows the shafts 2 and 8, and thus the rollers 4 and 7, to be approached to or removed from each other without changing the mutual engagement of the gearing wheels.

At the arrangement shown in Figs. 1–3 the rollers 4 and 7 are held, by means of spring power against the power receiving paths formed by the rail 5. Said spring power is effected by a spring 17, which may suitably be arranged between the casing parts 14ª and 14ᵇ, as shown in Fig. 3.

By this arrangement the result is obtained that the rollers 4 and 7 are, by means of the spring 17, held against their paths on the rail 5 with a mainly constant pressure, independently of the wear of the rollers and the paths that may possibly arise. This aim is arrived at by the rotatability of the casing parts 14ª and 14ᵇ in relation to each other as well as by the pivotal suspension of the motor by means of the pivots 1ª.

When the transmission of power to the driving wheel is to be interrupted, the rollers are removed from their paths. An arrangement suitable for this purpose is shown in Figs. 1 and 3. Opposite the spring 17, at the other side of the pivot 16, there is a chain 18 or the like, the ends of which are fixed to each of the casing parts 14ª and 14ᵇ. From the center of said chain a second chain 19 ascends, which is, in a suitable manner, connected with a longitudinally movable bar 20. The displacement of the bar 20 can suitably—as shown in Fig. 1—be effected by an adjustable arm or lever 21, pivoted to the cycle frame. When the arm is turned forward half a revolution, the rollers 4 and 7—on account of the turning of the casing parts 14ᵃ and 14ᵇ about the pivot 16—are removed from each other and thus from their paths, so that no transmission of power can take place. At this time the spring 17 is extended, in order to again contract and set the rollers against their paths, on the lever 21 being turned back to the position shown in Fig. 1.

When the rollers rest against their paths, there is no tension in the chain 18.

When only one of the rollers, that is to say the roller 4, delivers power to the driving wheel of the cycle, while the roller 7 only serves as a counter-pressure roller, the power transmitting arrangement between the rollers, that is to say the toothed wheels 10—13, is evidently eliminated.

Instead of being held against their paths with a resilient pressure, the rollers may be held against the paths with a positive (non-resilient) pressure. An arrangement for this purpose is shown in Figs. 4 and 5. For the chains 18 and 19 in the arrangement shown in Figs. 1 and 3 here bars or links 22 and 23 are substituted, which, thus, are connected with each other. Moreover, the bars are connected with the casing parts 14ᵃ and 14ᵇ, while the bar 23 is connected with a bar 24 corresponding to the bar 20. Said bar 24 is connected with a lever or arm 25 corresponding to the lever or arm 21, said lever 25 being rotatable along a bow 26, provided with teeth for the lever or arm 25. At the rotation backward of the arm 25 the rollers 4 and 7 are pressed with a positive pressure against their paths. The intensity of this pressure may be regulated thereby that the lever or arm 25 is brought into engagement with one or another of the teeth of the bow 26.

The arrangement shown in Fig. 6 forms a modification of the just mentioned one, as far as the bar 23 (or bars 22) consist of two parts slidable the one in the other, surrounded by a spring 27 compressed at the setting of the rollers against their paths, so that the rollers will be held against the paths with a resilient, adjustable pressure.

This invention may be carried out in other ways than those indicated by way of example. So, for instance, the roller shafts may each rotate about a special center, although the rotatability of the same about one and the same center, (pivot 16), as shown, is to be preferred.

Having now described my invention, what I claim as new and desire to secure by Letters Patent is:

1. In a driving device for motor cycles or other vehicles, the combination with a driving wheel, of a driving path carried on each side of the wheel, a roller engaging each path, a driving shaft for each roller, and means moving the rollers against or away from the paths about the axis of the driving shafts.

2. In a driving device for motor cycles or other vehicles, the combination with a driving wheel, of a driving path carried each side of the wheel, a roller engaging each path, a driving shaft for each roller, a two piece casing housing said shafts and means for moving the casing to move the rollers against or away from the paths about an axis of the driving shafts.

3. In a driving device for motor cycles or other vehicles, the combination with a driving wheel, of a driving path carried by each side of the wheel, a two section casing, transmission wheels carried thereby, a roller carried by each section of the casing and engaging its respective path, and means for moving the sections apart about the axis of the transmission shafts for moving the rollers against or away from the paths.

4. In a driving device for motor cycles or other vehicles, the combination with a driving wheel, of a driving path carried by each side of the wheel, a two section casing, transmission wheels carried thereby, a roller carried by each section of the casing and engaging its respective path, a spring for holding the sections together with the rollers in engagement with the paths, and means for moving the sections apart about the axis of the transmission shafts for moving the rollers away from the paths.

5. In a driving device for motor cycles or other vehicles, the combination with a driving wheel, of a driving path carried by each side of the wheel, a two section casing, transmission wheels carried thereby, a roller carried by each section of the casing and engaging its respective path, a spring for holding the sections together with the rollers in engagement with the paths, a chain connecting said section, and means connected to said chain for moving the casing sections apart about the axis of the transmission shafts for moving the rollers away from the paths.

6. In a driving device for motor cycles or other vehicles, the combination with a driving wheel, of a driving path carried by each side of the wheel, a two section casing, transmission wheels carried thereby, a roller carried by each section of the casing and engaging its respective path, means connecting the said sections, and means for operating said means whereby the sections are moved about the axis of the transmission wheels for moving the rollers in or out of engagement with the paths.

7. In a driving device for motor cycles or other vehicles, the combination with a driving wheel, of a driving path carried by each side of the wheel, a two section casing, transmission wheels carried thereby, a roller carried by each section of the casing and engaging its respective path, means connecting said sections, and a spring operating means for said means whereby the sections are moved about the axis of the transmission wheels for moving the rollers in or out of engagement with the paths.

In witness whereof I have hereunto set my hand in presence of two witnesses.

OSCAR WALFRID HULT.

Witnesses:
H. D. OHLSSON,
JACOB BAGGE.